United States Patent [19]

Falk

[11] Patent Number: 5,323,472
[45] Date of Patent: Jun. 21, 1994

[54] OPTICAL IMAGE ANALYZER USING OPTICAL CORRELATION AND OPTO-ELECTRONIC FEEDBACK

[75] Inventor: R. Aaron Falk, Renton, Wash.

[73] Assignee: The Boeing Company, Seattle, Wash.

[21] Appl. No.: 17,408

[22] Filed: Feb. 11, 1993

Related U.S. Application Data

[63] Continuation of Ser. No. 754,253, Aug. 27, 1991, abandoned, which is a continuation of Ser. No. 500,002, Mar. 27, 1990, abandoned.

[51] Int. Cl.$^5$ .............................................. G06K 9/74
[52] U.S. Cl. ........................................ 382/31; 382/42; 359/29; 359/239
[58] Field of Search ....................... 382/31, 42, 43, 46; 359/11, 29, 561, 239; 364/822

[56] References Cited

U.S. PATENT DOCUMENTS

| | | | |
|---|---|---|---|
| 3,634,695 | 1/1972 | Barringer | 250/550 |
| 3,636,330 | 1/1972 | Holeman et al. | 364/455 |
| 3,666,359 | 5/1972 | Lee | 382/31 |
| 3,891,968 | 6/1975 | McMahon | 382/4 |
| 4,097,749 | 6/1978 | Gardner | 250/550 |
| 4,115,801 | 9/1978 | Salmen et al. | 382/42 |
| 4,150,360 | 4/1979 | Kopp et al. | 382/6 |
| 4,174,885 | 11/1979 | Joseph et al. | 350/162.13 |
| 4,208,094 | 6/1980 | Tomlinson, III et al. | 350/96.18 |
| 4,573,198 | 2/1986 | Anderson | 382/31 |
| 4,637,056 | 1/1987 | Sherman et al. | 382/31 |
| 4,695,973 | 9/1987 | Yu | 350/162.13 |
| 4,736,437 | 4/1988 | Sacks et al. | 382/44 |
| 4,837,843 | 6/1989 | Owechko | 382/31 |
| 4,860,253 | 8/1989 | Owechko et al. | 359/29 |
| 4,949,389 | 8/1990 | Allebach et al. | 350/162.13 |
| 4,972,498 | 11/1990 | Leib | 382/31 |
| 5,107,351 | 4/1992 | Lieb et al. | 382/42 |

FOREIGN PATENT DOCUMENTS 0220110  4/1987  European Pat. Off. .............. 382/42

OTHER PUBLICATIONS

"Topics in Applied Physics, Optical Information Processing Fundamentals", vol. 48, pp. 43-67 (date unknown).

"The Infrared Handbook", W. L. Wolfe and G. J. Zissis, U.S. Government Printing Office, Office of Naval Research, Dept. of the Navy, Arlington, Va. (1978).

"A Featuer Space Rule-Based Optical Relational Processor", D. Casasent and A. J. Lee, SPIE, vol. 625, 234 (1986).

Primary Examiner—Leo H. Boudreau
Assistant Examiner—Larry J. Prikockis
Attorney, Agent, or Firm—Foley & Lardner

[57] ABSTRACT

An apparatus and method for image analysis utilizing an optical-electronic hybrid device. A light source generates light through an alternating series of lenses and electronically addressable spatial light modulators to an optical correlation plane. A first modulator introduces an input image and a second modulator introduces a Fourier transformed reference image into the device. The device correlates the input image and the reference image in the optical correlation plane. The optical correlation plane feeds back information through a processor to the second modulator which varies a parameter of the reference image. The second modulator varies parameters to determine the greatest correlation between the input image and the reference image. The parameters at the point of greatest correlation are used together with the reference image to identify the input image.

9 Claims, 4 Drawing Sheets

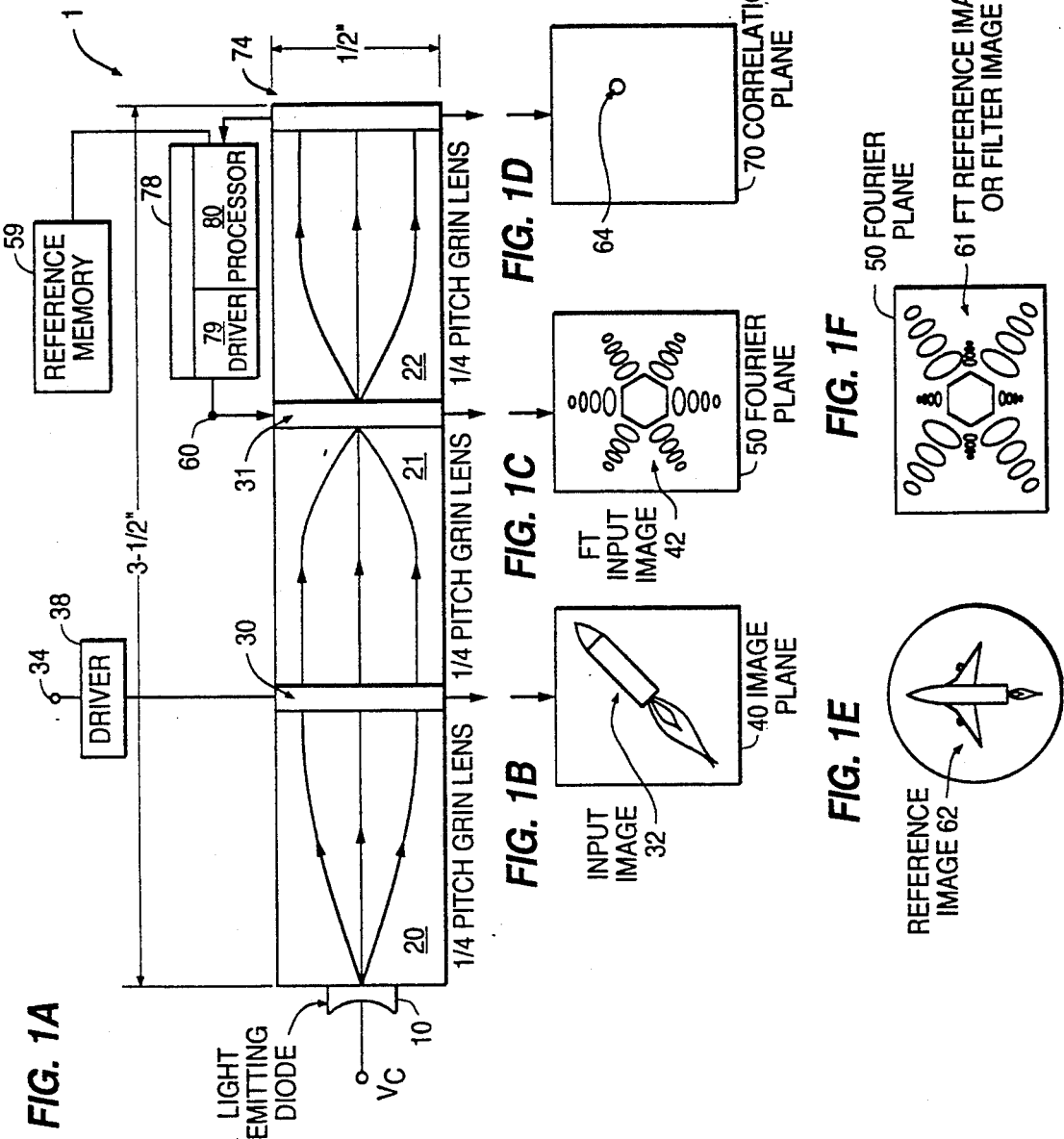

INPUT IMAGE

INITIAL REFERENCE IMAGE
THREE VARIABLES
ANGLE, LENGTH, WIDTH
$\theta_i \quad L_i \quad W_i$ MODIFIED REFERENCE IMAGE
ANGLE
$\theta_i \rightarrow \theta_f$ MODIFIED REFERENCE IMAGE
ANGLE, LENGTH
$\theta_f \quad L_i \rightarrow L_f$ MODIFIED REFERENCE IMAGE
ANGLE, LENGTH, WIDTH
$\theta_f \quad L_f \quad W_i \rightarrow W_f$

OPTICAL IMAGE ANALYZER USING OPTICAL CORRELATION AND OPTO-ELECTRONIC FEEDBACK

This application is a continuation of application Ser. No. 07/754,253, filed Aug. 27, 1991, now abandoned, which is a continuation of application Ser. No. 07/500,002 filed Mar. 27, 1990 now abandoned.

BACKGROUND OF THE INVENTION

The present invention relates to a technique for image analysis using an optical-electronic, hybrid device.

The instant invention utilizes the advantages gained by the parallel (global) operational capabilities of optics and the flexibility of electronics. It has been estimated that such a hybrid device would offer at least a factor of ten improvement in computational speed over an equivalent electronic device. Potential applications include final target identification, aim point selection for interceptors, target identification and classification for surveillance systems and robotics vision systems.

In general, most prior art systems use some form of look-up table procedure for recognizing input images. The look-up procedure is essentially an exhaustive search of a set of all possible fixed filters that describe an input image. As this search must include the basic image as well as all of the possible rotations, both in and out of plane, and image scale changes, the search must necessarily be very large.

SUMMARY OF THE INVENTION

It is therefore an object of the present invention to provide an optical image analysis device which utilizes image correlation methods instead of an exhaustive search of look-up tables that is conventionally used.

It is a further object of the present invention to provide an optical image analysis device which solves the problem associated with conventional systems in identifying images which are changed in scale or are rotated by utilizing a directed search approach in correlating the images instead of an exhaustive search as done in the prior art.

The instant invention achieves these and other objects by using optical and electronic devices for the image analysis. The optical image analysis device generates light which is transmitted through an alternating series of gradient-index-of-refraction (GRIN) lenses and electronically addressable spatial light modulators to an optical correlation plane. A first modulator introduces an input image and a second modulator introduces a Fourier Transformed reference image of a reference image into the device. The reference image is determined using a priori knowledge of an object in question. The optical image analysis device correlates the input image and the reference image at the optical correlation plane. The optical correlation plane feeds back information through a feedback loop to the second modulator and certain parameters of the Fourier transformed reference image are varied until a maximum correlation between the input image and the reference image has been obtained. The reference image at the beginning of feedback and the parameter values at a point of maximum correlation are used to identify the object in question.

BRIEF DESCRIPTION OF THE DRAWINGS

FIGS. 1 A–F are block diagrams of the optical image analysis device according to the present invention.

DETAILED DESCRIPTION OF THE PREFERRED EMBODIMENTS

Figure 2A:
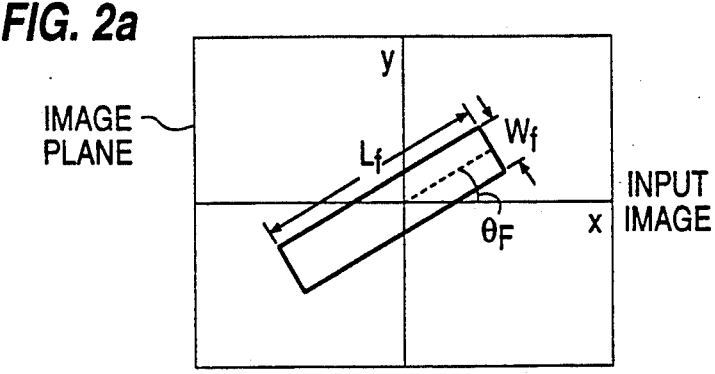
FIG. 2a is an example of a simple input image.
Figure 2B:
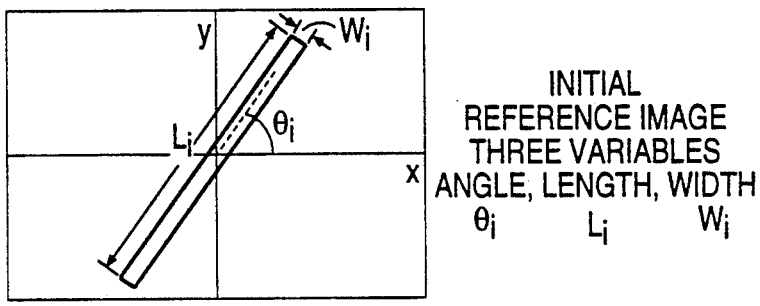
FIGS. 2b –2e are examples of the corresponding reference images as the angle, length and width parameters are varied by the feedback loop.
Figure 2C:
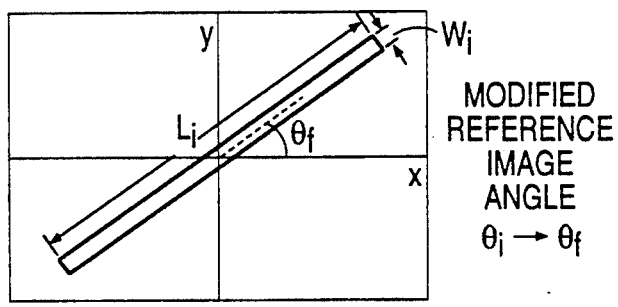

The instant invention utilizes an active filter approach by changing a filter in response to a feedback signal. After entering an initial reference image, the feedback signal is derived by measuring the correlation between the initial reference image and an input of an object to be identified. This results in a modified reference image or simply a reference image, which corresponds to the active filter. The initial reference image is described by a set of parameters. For example, the parameters might include rotation and scale. The set of parameters correspond to a set of filter parameters. These filter parameters are varied in accordance with standard feedback techniques. Final values of the filter parameters are those which yield the highest correlation between the input image and the reference image. These final values as well as the initial reference image are used to identify the input image. Only the initial reference image and the operators that change the filter parameters need to be stored. The feedback loop is expected to converge rapidly to the correct solution without having to perform an exhaustive search of all possible correlations.

Referring now to FIG. 1, the layout of the instant invention, an optical imaging analyzer (OIA), 1 is shown. The OIA, 1 includes a light emitting diode or laser diode 10 for generating spatially coherent light through the optical path of the device. The generated light passes through a first of three lenses 20 to an electronically addressable spatial light modulator (EASLM) 30. The EASLM 30 can be a liquid crystal light valve, for example.

An analog signal corresponding to an input image 32 of an object in question is input at an analog input 34 to a driver circuit 38, which reproduces the input image 32 on an image plane 40 located at EASLM 30. The generated light is transmitted through the image plane 40 and passed through a second lens 21 to a second EASLM 31. The second lens 21 transforms the input image 32, and a Fourier transformed input image 42 of the input image 32 appears at a Fourier plane 50 located at EASLM 31.

EASLM 31 has an analog input 60. Hence, EASLM 31 functions as an active spatial filter. The input image 32 is filtered by inputting a part or all of a Fourier transformed reference image or filter image 61 of a reference image 62 at the analog input 60 to EASLM 31. The filter image 61 can be stored in a reference memory 59.

The final stage of the OIA 1 comprises a third lens 22 for correlating the input image 32 with the reference image 62 resulting in a correlation spot 64 at a correlation plane 70. For an example of the use of Fourier transform optics, see S. H. Lee, Ed., *Topics in Applied*

*Physics, Optical Information Processing Fundamentals,* Volume 48, Springer-Verlag, especially Chapter 2, pp. 43–67, incorporated herein by reference.

It should be noted that it is preferable to utilize ¼ pitch gradient-index-of-refraction (GRIN) lenses such as the Melles Griot 06 LGS lenses for the lenses 20, 21, and 22.

The correlation spot 64 is detected using a CCD imager 74. The output of the CCD imager 74 is passed through a feedback loop 78, which in turn controls the filtering properties of EASLM 31. In particular, the feedback loop 78 varies a set of filter parameters, which correspond to parameters of the reference image 62, such as rotation and scale parameters. The feedback loop 78 has drivers 79 nesessary to drive the EASLM 31. The drivers 79 are responsive to the output of a processor 80 operating in response to a computer program with an algorithm to be described. The processor 80 outputs data which is input to the drivers 79, which in turn output the signals necessary to produce the filter image 42 at the Fourier plane 50. Hence, the EASLM 31 allows direct control of the filter at the filter plane 50 by the feedback loop 78. It should also be noted that in a similar manner the EASLM 30 allows for windowing the input image 62 in the image plane 40 so as to reduce unwanted clutter.

The feedback loop 78 varies the values of the filter parameters and/or the parameters of the reference image 62 according to standard feedback techniques. This feedback technique corresponds to a template matching algorithm in which either the parameters describing the reference image 62 and/or the filter parameters are varied and the effect on the magnitude of the correlation spot 64 is determined. For example, if after varying a particular filter parameter in one direction, the CCD imager 74 measures a lower correlation between the input image 32 and the reference image 62, then the feedback loop varies that particular filter parameter in the opposite direction. This is continued until a maximum correlation has been achieved, at which point the final values of the filter parameters together with the initial reference image are used to identify the object in question.

If the filter parameters were properly chosen, the final set of parameter values together with the initial reference image can be used to identify the object in question. The algorithm per se is mathematically similar to standard multidimensional tracking algorithms. See for example, *The Infrared Handbook*, W. L. Wolfe and G. J. Zissis, U.S. Government Printing Office, Office of Naval Research, Department of the Navy, Arlington, Va. (1978) incorporated herewith by reference.

An example of the template matching algorithm involves using a partial-derivative correlation-tracking concept to measure a change in magnitude of correlation resulting from varying a given filter parameter. The processor 80 receives digital data corresponding to data by the CCD imager 74. These data can be stored in an array $C(x,y)$ where each point $(x,y)$ corresponds to a point on the correlation plane 70. Suppose that the correlation function $C(x,y)$ has a main peak near $x_0,y_0$, the several, smaller, local maxima at other points. When the filter parameter is changed, the peak of the correlation spot 64 might shift from $x_0,y_0$ to $x', y'$. The processor then receives a new set of data $newC(x,y)$ corresponding to signals output by the CCD imager 74 after changing the filter parameter. Hence, the magnitude of the correlation spot 64 at $x_0,y_0$, i.e., $C(x_0,y_0)$ must be compared to the magnitude of the correlation spot 64 at $x', y'$, i.e., $newC(x', y')$ resulting from changing the filter parameter. The quantity $newC(x',y')$ can be obtained by first determining where the new peak is located i.e., determining $x', y'$, and then selecting the stored value of $newC$ at $x', y'$. The point $x',y'$ can be obtained by calculating $\partial\, newC/\partial x$ and $\partial\, newC/\partial y$ at $x_0,y_0$, provided that the new peak position $x',y'$ is within an area determined by the width of the correlation spot 64. If the change in peak location is larger than the width of the original correlation spot 64, then a sequential similarity detection algorithm (SSDA) can be used to find $x',y'$ as described in the *Infrared Handbook*, W. L. Wolfe and G. J. Zissis.

Some simple, concrete examples of image analysis according to the present invention are shown in FIG. 2. In FIG. 2a, an input image is a rectangle of length $L_f$ and width $W_f$ positioned at an angle $\Theta_f$ with respect to the image plane X axis. In FIG. 2b, the initial reference image consists of a narrow rectangle of length $L_i$ and width $W_i$ positioned at an angle $\Theta_i$ with respect to the reference plane X axis. Use of a rotation operator would rotate the reference image slightly, and the magnitude change of the correlation spot 64 is determined. Positive change implies an improved fit first and negative change implies a worse fit. The filter would be rotated until the best fit was obtained, thus determining the angle $\Theta_f$ as in FIG. 2c. Note that an exhaustive search of all angles is not needed, but rather a directed search is employed to quickly converge on the correct answer.

Figure 2D:
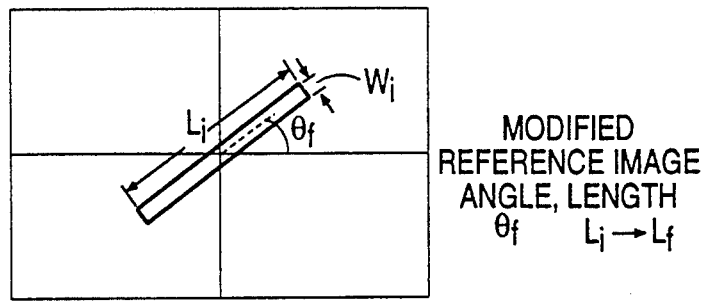
Figure 2E:
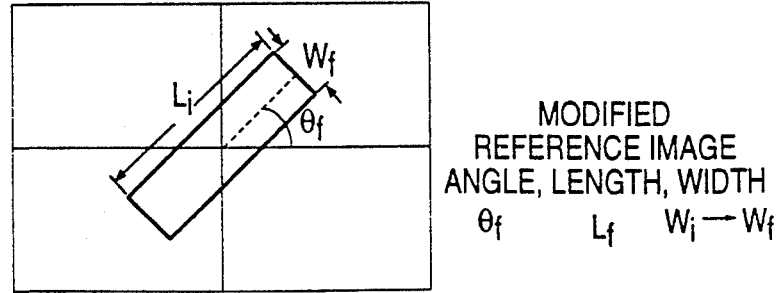

In a similar manner, the parameters of length and then width are each varied from Li to $L_f$ and then Wi to $W_f$, as shown in FIGS. 2d and 2e respectively. Note than in an actual OIA, the parameters corresponding to length, width and angle would not necessarily be varied directly, instead the corresponding Fourier transformed parameters or filter parameters could be varied. This corresponds to varying the Fourier transformed reference image directly.

The final optical plane is the correlation plane 70. The location of the correlation spot 64 corresponds to the initial object location. The location can be determined by a separate processing channel of associated hardware or might be determined by searching the correlation plane 70. It is further assumed that the object in question can be adequately described by a finite number of parameters, together with the proper reference image 62, an example of which will follow. Clearly, in order to know which parameters to select, some a priori knowledge of the image is required. This knowledge may simply be given or can be determined by a separate signal channel of associated hardware. For an example of an optical technique for performing this function, reference can be made to D. Casasent and A. J. Lee, *SPIE*, Volume 625, "Optical Computing," 234 (1986), incorporated herein by reference.

Figure 3:
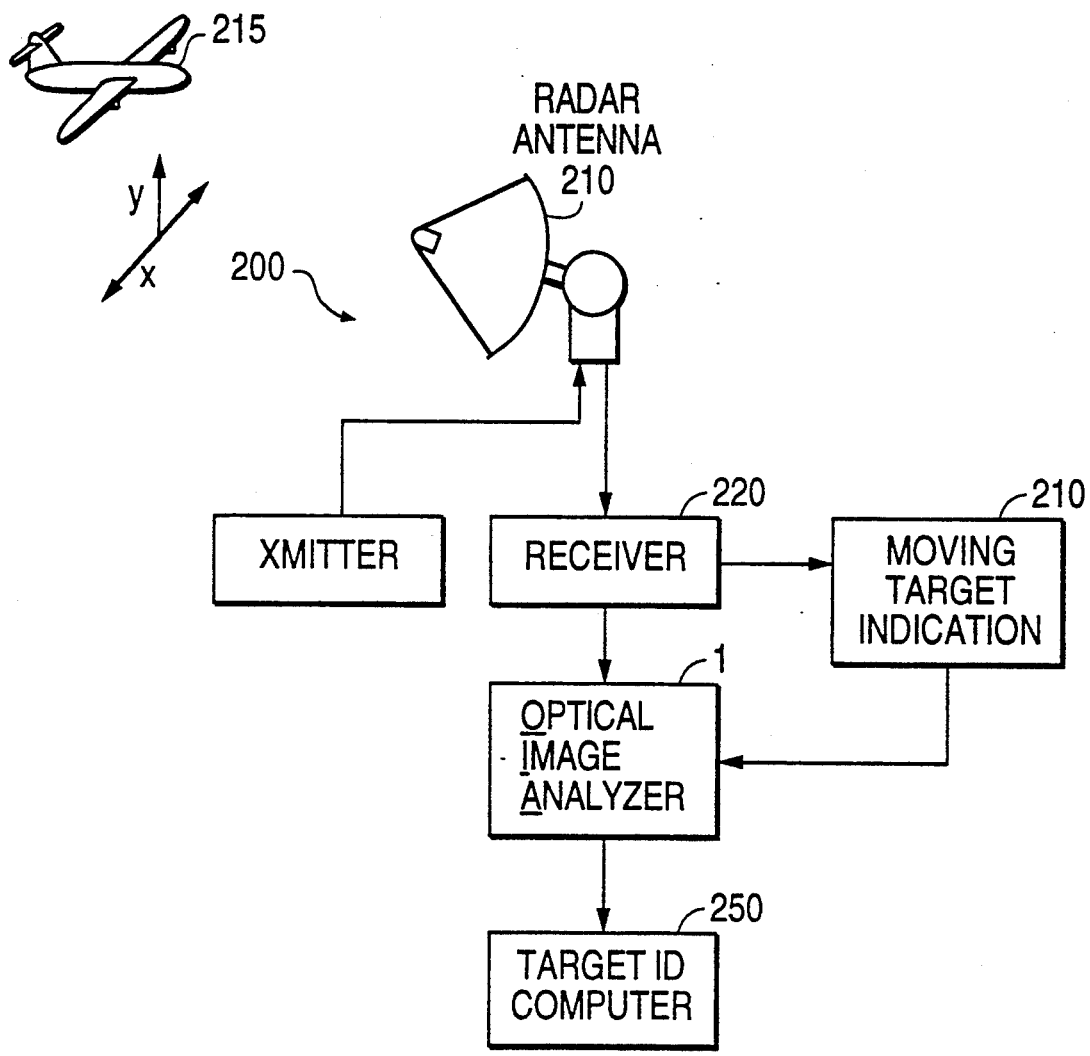
FIG. 3 is a block diagram of the present invention used in a radar system.
Figure 4A:
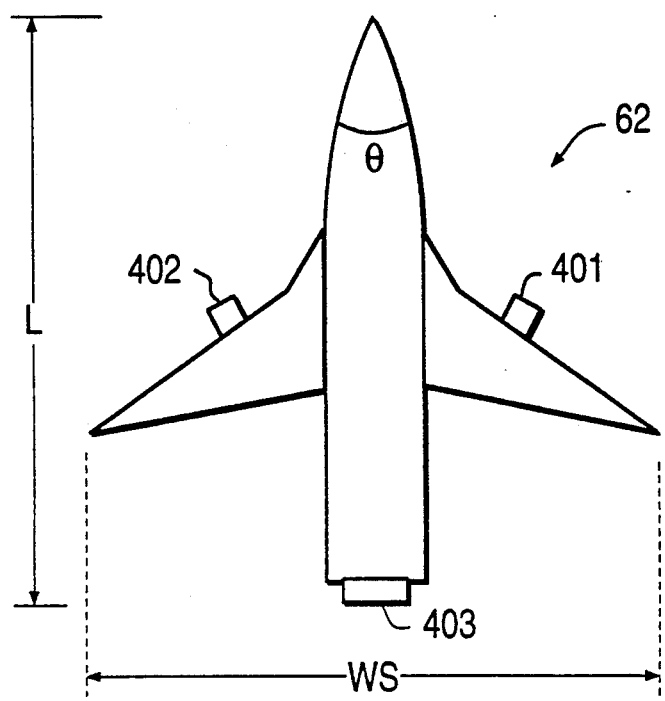
FIGS. 4a–4c shows three orientations of a reference image which could be used to distinguish a MIG and a 747 airliner.
Figure 4B:
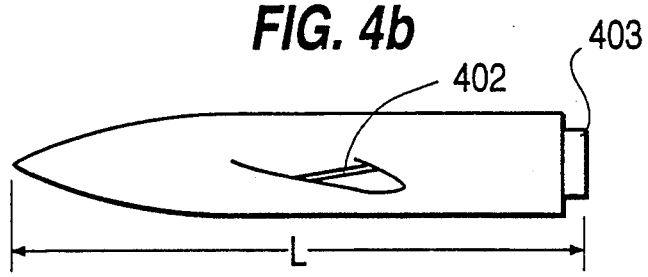
Figure 4C:
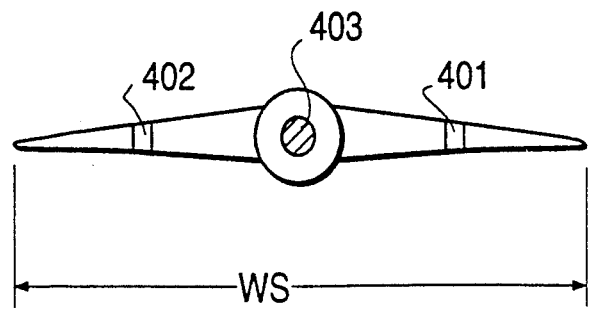

An example system using the OIA 1 is shown in FIG. 3. The system 200 is an imaging radar or laser radar with an attached Moving Target Indicator, MTI 210. The radar obtains an image of an object in question that can be sent directly to the OIA 1. If only moving targets are of interest the image can be sent to the OIA 1 via the MTI 210. The MTI 210 looks for targets that are moving and sends target position information to the OIA 1. The target area is then correlated with an a priori reference image by the OIA 1. If one wished to identify an aircraft (MIGs vs. Boeing 747 airliners for example) a priori knowledge could consist of the reference image 62 in FIG. 4a. In this case, the filter parameters could correspond to the cone angle Θ, the wing span WS, the aircraft length L as well as the number, type and relative positions, of engines 401, 402, and 403. The OIA 1 would vary these filter parameters, for all possible orientations of reference image 62 as in FIGS. 4b and 4c to determine a best fit, and send these final values of either the filter parameters or the corresponding reference image parameters to a target ID computer 250 to be compared to known parameters (a priori knowledge) so as to perform target identification. The target ID computer 250 then outputs the probability that the object in question is a MIG and the probability that it is a 747 airliner.

It can be appreciated to those of ordinary skill in the art that not all objects have parameters that are as readily separable as those in the above example. In general, care must be exercised in the parameter selection so that the algorithm will quickly converge to the correct solution. The advantage of this technique over current optical techniques which consist of comparing the input object with stored examples of all of the possible variations is considerably decreased memory storage in that only a few parameters and variation operators need be stored, and rapid iteration to the correct solution. The advantage over an all-electronic device is the rapid performance of the image-filter correlation by the optical system.

What is claimed is:

1. An optical image analysis device, comprising:
   a first lens for projecting a spatially coherent light beam onto an image plane;
   a first spatial light modulator for introducing an input image onto said image plane through which said light beam passes, said input image corresponding to an object in question;
   a second lens positioned downstream from said image plane by its focal length so as to receive said light beam after said light beam passes through said first spatial light modulator, said second lens producing a Fourier transformed input image at a Fourier plane positioned downstream from said second lens by a distance of the second lens focal length;
   a second spatial light modulator positioned at said Fourier plane;
   driving means coupled to said second spatial light modulator to produce a Fourier transformed reference image using a predetermined reference image and predetermined filter parameters, said predetermined filter parameters corresponding to parameters of said predetermined reference image;
   a third lens positioned downstream of said Fourier plane by a focal length of said third lens, said third lens correlating said Fourier transformed input image and said Fourier transformed reference image by producing a correlation image at a focal plane of said third lens;
   imaging means for detecting a magnitude of correlation of said correlation image;
   feedback means, coupled to said imaging means and said driving means for varying said Fourier transformed reference image in a Fourier domain by varying parameter values of said predetermined filter parameters until said magnitude of correlation is maximized to identify best fit parameter values; and
   identifying means for identifying said object in question according to said predetermined reference image and said best fit parameter values.

2. An optical image analysis device as recited in claim 1, wherein said first, second and third lenses are comprised of graded-index-of-refraction lenses.

3. An optical image analysis device as recited in claim 1, wherein said feed back means includes a processor which utilizes a template matching algorithm so as to vary said parameter values of said Fourier transformed reference image.

4. A method of analyzing optical images comprising the steps of:
   a) projecting a spatially coherent light beam onto an image plane using a first lens;
   b) introducing via a first spatial light modulator an input image onto said image plane through which said light beam passes, and input image corresponding to an object in question;
   c) positioning a second lens downstream from said image plane by its focal length so as to receive said light beam after said light beam passes through said first spatial light modulator;
   d) producing a Fourier transformed input image at a Fourier plane positioned downstream from said second lens by a distance of a focal length of said second lens;
   e) producing a Fourier transformed reference image on a second spatial light modulator at said Fourier plane using a predetermined reference image and predetermined filter parameters, said predetermined filter parameters corresponding to parameters of said stored reference image;
   f) producing, via a third lens, a correlation image representing a correlation of said Fourier transformed reference image and said Fourier transformed input image at a correlation plane located downstream of said Fourier plane by a focal length of said third lens;
   g) varying said Fourier transformed reference image in a Fourier domain by varying values of said predetermine filter parameters to determine particular parameter values producing a maximum correlation; and
   comparing said particular parameter values with known parameter values associated with said predetermined reference image and identifying said object in question on a basis of said comparison.

5. The method of claim 4, wherein said varying step comprises the step of utilizing a template matching algorithm so as to vary said predetermined filter parameters.

6. A method of analyzing optical images, as claimed in claim 4, varying step includes the step of stopping said varying of said values of said predetermined filter parameters when said correlation image corresponds to a point at which a correlation curve has a slope of zero.

7. An optical image analysis device, comprising:
   means for generating light through an optical path and onto an image plane;
   first modulator means for introducing an input image into said image plane of said optical path, said input image corresponding to an object being analyzed;
   second modulator means for introducing a filter image onto said optical path at a Fourier plane and for receiving said input image at said Fourier plane, said filter image being generated from a predetermined reference image and values of a plurality of predetermined filter parameters, said predetermined filter parameters corresponding to parameters of said predetermined reference image;

correlation means for correlating said input image and said filter image at an optical correlation plane and for outputting a correlation signal;

feedback means coupled to said correlation means and said second modulator means for varying said filter image in a Fourier domain by varying said values of said plurality of predetermined filter parameters until said correlation signal is optimized in order to identify best fit parameter values; and identifying means for identifying said input image on a basis of said predetermined reference image and said best fit parameter values.

8. An optical image analysis device as recited in claim 7, wherein said feedback means comprises a processor which utilizes a template matching algorithm so as to vary said values of said plurality of predetermined filter parameters.

9. A method of analyzing optical images comprising the steps of:

a) introducing a Fourier transformed input image of an input image corresponding to an object to be identified at a Fourier plane of an optical path;

b) introducing, via a spatial light modulator, a Fourier transformed filter image at said Fourier plane representative of a predetermined reference image;

c) producing a correlation image representative of a correlation between said Fourier transformed input image and said Fourier transformed filter image;

d) directly varying said Fourier transformed filter image in a Fourier domain by varying values of predetermined filter parameters of driving signals supplied to said spatial light modulator so as to successively introduce new filter images in said Fourier domain until said correlation between said Fourier transformed input image and said filter images, represented by a particular Fourier transformed filter image, is maximized, said filter parameters corresponding to parameters of said predetermined reference image;

e) determining particular values of said predetermined filter parameters when said correlation is maximized in step d);

f) identifying said object on a basis of said predetermined reference image and said particular values of said predetermined filter parameters.

* * * * *